April 14, 1925.
T. H. MARTIN-HARVEY
1,533,936
SURFACE WIRING FOR ELECTRICITY DISTRIBUTING SYSTEMS
Filed March 28, 1923
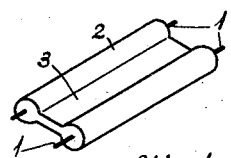
Fig. 1.
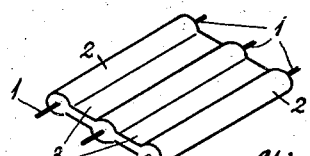
Fig. 2.
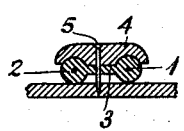
Fig. 3.
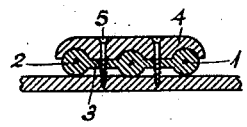
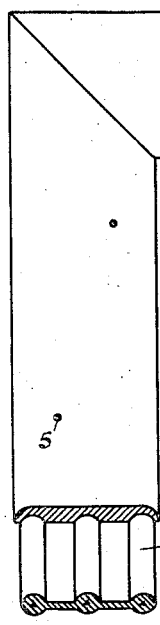
Fig. 6.
Fig. 4.
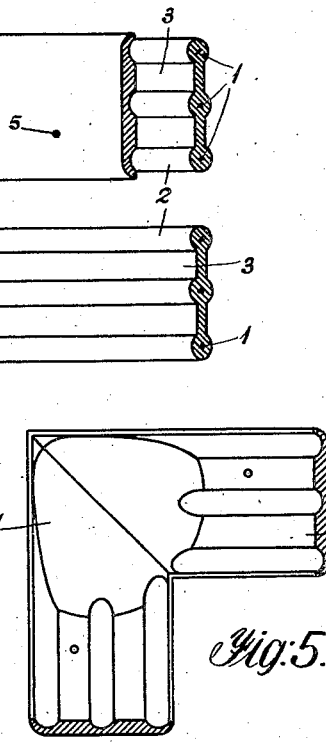
Fig. 5.
INVENTOR.
Thomas Henry Martin-Harvey.
by Arthur J. Stephens
Attorney.

Patented Apr. 14, 1925.

1,533,936

UNITED STATES PATENT OFFICE.

THOMAS H. MARTIN-HARVEY, OF BICKLEY, ENGLAND.

SURFACE WIRING FOR ELECTRICITY-DISTRIBUTING SYSTEMS.

Application filed March 28, 1923. Serial No. 628,389.

*To all whom it may concern:*

Be it known that I, THOMAS HENRY MARTIN-HARVEY, a subject of the King of Great Britain and Ireland, residing at Tomatin, Park Hill, Bickley, Kent, England, have invented new and useful Improvements in and Relating to Surface Wiring for Electricity-Distributing Systems (on which application has been made for Letters Patent in Great Britain, No. 17,386, dated 23rd June, 1922, cognate with No. 29,501 dated 28th October, 1922), of which the following is a specification.

The present invention relates to those electrical cables in which two or more conductors are embedded parallel to one another in a covering of insulating material, such as rubber, with a web between adjacent conductors.

Referring now to the accompanying drawings, in which Figure 1 shows a perspective view of a two-conductor cable according to the invention.

Figure 2 shows a similar view to Figure 1 of three-conductor cable according to the invention.

Figure 3 shows sections of the cables shown in Figures 1 and 2, with their covering strips in position over them.

Figure 4 shows a view of a cable doubled over at a corner.

Figure 5 shows a reverse view of the covering strip at a corner, prepared for use.

Figure 6 shows a view of a completed corner according to the invention.

Referring to Figures 1 and 2, the cable consists of two or more conductors 1 embedded in a covering of insulating material 2. The groove formed by the web 3 between the conductors 1 is the same on both sides, so that the cable is reversible.

As shown in Figure 3, the under-surface of the covering strip 4 corresponds in shape with the cable and is held by the nails or screws 5 through the web.

In Figure 4, the cable is shown doubled over at 6 to form a corner, and, as the cable is reversible, it can receive the covering strip on both sides of the corner. The slight bulge caused is accommodated by hollowing out the covering strip 4, as shown at 7 in Figure 5. As will be seen from Figure 6, the completed corner is continuous without lateral or upward bulging, and no special fitments are required.

What I claim is:

1. In a surface wiring system, a ribbed cable doubled over at corners, and a covering strip shaped conformably to the cable hollowed out at corners to accommodate the increased thickness formed by doubling the cable.

2. In a surface wiring system, a cable comprising a ribbed insulating strip formed with webs equally grooved on both sides and parallel conductors embedded in said strip between said webs, said cable being doubled over at corners, and a covering strip shaped conformably to the cable hollowed out at corners to accommodate the increased thickness formed by doubling the cable.

3. In a surface wiring system, a cable comprising a series of parallel thick insulating strips, a series of thin insulating webs joining said strips and a series of parallel conductors embedded in said thick strips, said cable being doubled over at corners, and a covering strip shaped conformably to the cable hollowed out at corners to accommodate the increased thickness formed by doubling the cable, and having its outer surface in the same plane at corners as the straight portions.

In witness whereof, I have signed my name to this specification.

T. MARTIN-HARVEY.